United States Patent Office 2,959,954
Patented Nov. 15, 1960

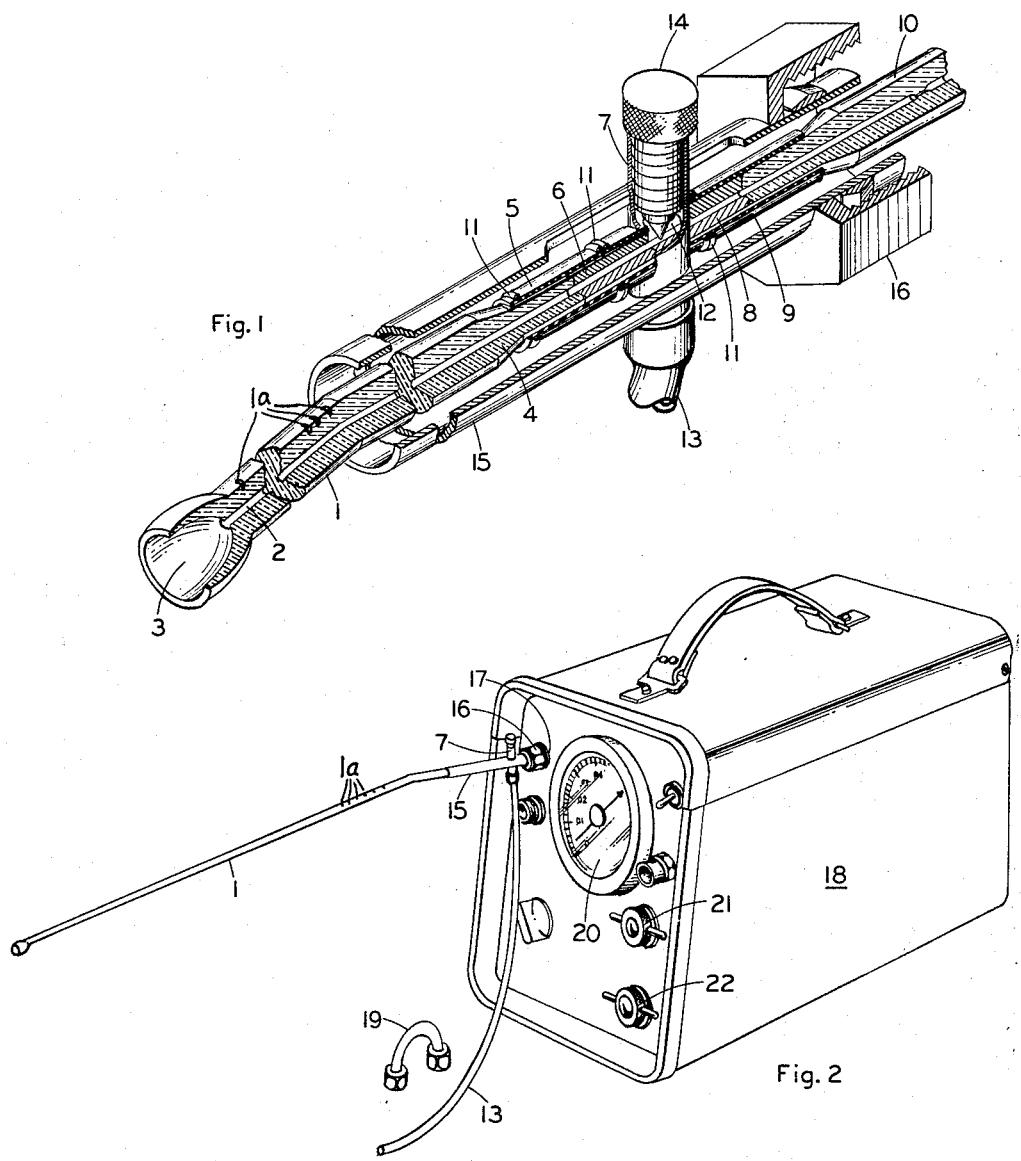

2,959,954

GAS FLOW CALIBRATOR

John A. Roberts, Lynnfield, Mass., assignor to General Electric Company, a corporation of New York Filed July 11, 1957, Ser. No. 671,342

5 Claims. (Cl. 73—3)

My invention relates to a gas flow calibrator suitable for use in determining the mass flow rate of a gas or vapor through a standard capillary tube.

A standard capillary tube which has a cylindrical bore of fixed and predetermined dimensions may be used as an adjustable leak to air since the amount of gas supplied therethrough will depend on the gas and its pressure at the inlet end of the capillary tube. Such an adjustable leak may have many uses provided the weight flow of gas therethrough is determined. For example, it may form part of apparatus such as described and claimed in my application Serial No. 671,265 for Leak Standard, filed July 11, 1957. This leak standard is employed for making a quantitative evaluation of the indication of a leak detector such as described and claimed in United States Letters Patent 2,550,498, Chester W. Rice, granted April 24, 1951.

The leak detector of the above-identified patent provides, on an electric meter forming a part thereof, an indication, the value of which depends on the conductivity of a sensitive diode element due to positive ion formation at its heated anode in the presence of certain substances. The presence of a leak is detected by noting the change in meter reading for a change in conductivity of the sensitive element of such a detector in response to the supply, between its electrodes, of air containing a tracer gas to which the sensitive element responds. Since the surrounding air normally contains some of the tracer gas, the meter reading of the detector is zeroed for the normal contamination of the air by this tracer gas and a leak through which the tracer gas is supplied provides on the meter a leak indication, the magnitude of which depends on the amount of tracer gas supplied through the leak. The leak detector, consequently, is a comparative instrument and provides an indication of the amount of gas normally present in the air to that which is present at a leak through which the tracer gas is supplied into the air. The leak standard of my above-identified application is used to obtain a quantitative evaluation of the magnitude of a new leak by calibrating the response of the leak detector against the leak standard which can be set to provide a controlled and adjustable rate of leakage of the tracer gas.

Since the tracer gas most commonly employed is a halogen-containing gas, the above-identified leak detector and leak standard are commonly referred to as a halogen leak detector and a halogen leak standard. The most commonly used tracer gas is the vapor of dichlorodifluoromethane, which is known to the trade as Freon 12. The vapor of this particular halogen compound is used as a tracer gas because of its low cost, availability, desirable vapor pressure, lack of toxicity, and freedom from creating hazards of fire and explosion. It is to be understood, however, that other tracer gases or vapors may be employed and that the several devices referred to are not limited to the use of this halogen compound.

Commercial forms of halogen leak detectors are very sensitive instruments and will provide an indication of leak rates as small as 1/100 of an ounce per year. The halogen leak standard must, consesuently, incorporate a standard leak assembly in which the flow rate of gas through a standard capillary tube into a carrier air stream of filtered air is of the same order of magnitude. This capillary tube may be formed of glass and have a bore of 0.003 inch in diameter which is reduced along a portion of its length to a size which is normally invisible to the naked eye. The mass flow rate of gas through this capillary for various gas pressures at its inlet end must be determined so that the pressure gauge of the leak standard which indicates the inlet pressure on this capillary tube may be calibrated in mass flow rates indicative of the amount of gas being delivered through the standard capillary tube.

It is an object of my invention to provide apparatus for use in determining the mass flow rate of a gas through a standard capillary tube.

It is also an object of my invention to produce apparatus for determining the displacement rate of a small span of indicating liquid in a calibrated capillary tube due to gas flow into one end thereof.

My invention, together with further objects and advantages thereof, will best be understood by reference to the following specification, taken in connection with the accompanying drawing in which a preferred embodiment thereof has been illustrated.

In the drawing, Fig. 1 is a perspective view with parts broken away to show the construction of a gas flow calibrator embodying my invention; and Fig. 2 is an illustration showing the calibrator of Fig. 1 mounted in place on the "calibrate" fitting of a halogen leak standard such as shown and described in my application Serial No. 671,265 above referred to.

As shown in Fig. 1 of the drawing, my gas flow calibrator comprises a glass or suitable transparent tube 1 having a capillary bore 2 terminating at its outer end in a cup-shaped cavity 3 and having a graduated scale, a portion of which is shown as 1a, extending along a volume calibrated portion of its bore. The inner end of this glass tube terminates in a tapered end portion 4 which is joined by a flexible tubular connection 5 to one end 6 of the tubular body portion of a vent valve 7. The other end 8 of this tubular body portion of this valve is provided with a second flexible tubular connection 9 for attachment to the tapered discharge end of the standard capillary tube 10 of a halogen leak standard when in use for calibrating gas flow therethrough. The ends of flexible connection 5 are held in gas-tight union with the parts 4 and 6 of tube 1 and valve 7 by spring clamps 11 and a spring clamp 11 is also employed for holding the inner end of the flexible connection 9 in gas-tight union with the tubular portion 8 of valve 7. The outer end of tubular connection 9 is adapted to slip over and make a gas-tight union with the discharge end of the standard capillary tube 10 of the leak standard when the parts are assembled in operative relationship as shown in the drawing. It will be noted that the parts are assembled with their ends in abutting relation and that the longitudinal passageway through the tubular body portion of the valve is of comparable size to the bore in the glass tube of the calibrator.

Vent valve 7 is a manually controlled needle valve in which the longitudinal passageway through its tubular body portion 6, 8 is connected by a vent passageway which extends through the control parts of the valve to an enclosure 12 terminating in a tubular discharge opening 5 which forms a continuation of the enclosure 12. A flexible control tube 13 has its inner end connected with this tubular discharge portion of enclosure 12. Vent valve 7 has a threaded stem which engages a threaded portion of the valve body so that relative rotation of the parts by actuation of a finger piece 14 will control the position of the needle valve tip in its seat which extends through and to the longitudinal passageway in the tubular body portion of the valve.

The inner end of glass tube 1 and vent valve 7 and its connections are enclosed in and supported by a tubular member 15 having a threaded coupling 16 at its inner end by means of which it may be mounted on and supported by a mating coupling 17 on the front panel of a leak standard 18 as shown in Fig. 2. Since the front panel of this leak standard is inclined to the horizontal by about ten degrees, the capillary tube 2 is angularly disposed by the same angle to its support tube 15 so that when this support tube is attached by the cooperating coupling members on the support tube 15 and on the front panel of the leak standard, the calibrated portion 1a of glass tube 1 will be held in a horizontal position.

As stated above, the calibrator of Fig. 1 may be mounted on the "calibrate" fitting 17 of a halogen leak standard 18 as shown in Fig. 2. This calibrate fitting is exposed by removing a by-pass fitting 19 from the front panel of the leak standard. The removal of this by-pass fitting from the leak standard exposes the discharge end of its standard capillary tube 10 to which gas is supplied at its intake end under pressure indicated by the pressure gauge 20. The desired pressure at the intake end of the standard capillary tube 10 is controlled by a suitable manipulation of increase and decrease valves 21 and 22 of the leak standard and the construction of the parts thereof are such that once a predetermined pressure setting has been obtained, this pressure will be maintained constant or static during the period of any test.

When the parts are mounted as shown in Fig. 2, gas is supplied through the calibrator for a sufficient period of time to clear the passageways through vent valve 7 and glass capillary tube 1 of all traces of air. This is done by adjusting the pressure gauge 20 of the leak standard to a desired setting which is to be calibrated and by closing the vent valve of the calibrator so that the gas discharged from the standard capillary tube 10 is forced to flow through the capillary passage in tube 1. After such clearing action, vent valve 7 is opened and a drop of colored indicating liquid is placed in the cup-shaped cavity 3 of tube 1 and about a one-inch length of such liquid is drawn within the capillary bore of this tube by sucking on the end of control tube 13. Thereupon the excess indicating liquid in cup portion 3 of tube 1 is removed with a clean cotton swab or the like and additional suction is applied to control tube 13 with the vent valve still open to draw this span of liquid all the way into the capillary tube 1 but not beyond the end of its support tube 15. Then, the vent valve is closed and after the indicating liquid has moved about fifty divisions along the bore 2 of tube 1 as indicated on the graduated scale 1a in order to establish a uniform motion thereof, a time measurement is taken of the length of time required for the indicating fluid to travel a certain number of divisions along the calibrated capillary of tube 1. In making this observation, the portion of the scale used must be noted since the capillary of the tube 1 is calibrated to indicate variations in the size thereof at different scale locations along its length. If the operation is to be repeated, the vent valve 7 should be opened before the span of indicating liquid is forced from the end of capillary tube 1 and the above-described operation repeated in order to obtain an average reading if such is considered necessary.

The bore of the capillary in tube 1 is calibrated by weighing a column of mercury spanning a specified number of its divisions along successive sections thereof; and when this is done, a non-uniformity correction in the form of a chart is also made to show volume variations lengthwise of the bore through tube 1. In view of these determinations, the weight flow of gas in the capillary passage of tube 1 is determined by multiplying the capillary divisions per second observed by the density of the gas in grams per cubic centimeter at the temperature of the test and by a constant K to obtain a value in ounces per year. The constant K varies for any particular capillary tube 1 and is the product of the weight of the mercury in milligrams per division of its capillary passage, the reciprocal of the specific weight of mercury in grams per cubic centimeter, and two conversion constants respectively giving ounces per milligram and seconds per year.

The viscous laminar flow of gas through a cylindrical capillary is governed by the Poiseuille law:

$$N_m = \frac{\pi}{16 \eta T} \cdot \frac{a^4}{l} \cdot \frac{P_2^2 - P_1^2}{R_0 T_m}$$

wherein $N_m$ is in moles per second, $\eta T$ is the coefficient of viscosity at temperature T of the capillary, $a$ and $l$ are, respectively, the radius and length of the cylindrical capillary in centimeters, $P_2$ and $P_1$ are, respectively, the upstream and downstream pressures in microbars at the ends of the capillary, $R_0$ is the gas constant, and $T_m$ is the temperature at which the moles per second is measured. From this formula, it will be noted that the weight of gas flow is inversely proportional to absolute temperature and absolute viscosity and proportional to the difference of the squares of the inlet and outlet pressures of the capillary tube 10.

It is desirable to calibrate the pressure gauge 20 of the leak standard in leak rate at standard atmospheric pressure (29.921 in. of mercury at 0° C.) and at a room temperature of 25° C. Consequently, observations made at other barometric pressures and at other temperatures must be converted in accordance with correction constants to obtain such a desired calibration. These correction constants can be obtained from charts prepared by using the above Poiseuille formula so that the weight of gas passing through the standard capillary 10 of the leak standard may be evaluated for standard atmosphere at 25° C. as follows:

$$W_{SA\ 25°\ C.} = \left(\frac{\text{capillary divisions}}{\text{seconds}}\right) C_a C_T K C_P$$

In this formula, K is the capillary constant of tube 1 and the correction factors $C_T$ and $C_P$ are obtained from prepared charts in one of which the plot of $C_T$ vs. temperature is presented as a family of curves corresponding to various atmospheric pressures and in the other of which the plot of $C_P$ vs. pounds per square inch gauge pressure of gas is presented as a family of curves corresponding to various atmospheric pressures. $C_a$ is the average volumetric coefficient for that portion of the capillary tube along which the span of indicating fluid traveled and is obtained from the volume correction curve for this tube. The slight change in capillary volume due to ambient temperature variations may be disregarded. Tube 1 is conveniently fabricated from a thermometer and for normal thermometer glass, a 40° C. variation in room temperature will only cause a 0.0132% change in capillary volume which is negligible in view of an expected accuracy of capillary calibration of about 0.5%.

In making a calibration with my apparatus above described, it is desirable that only a small quantity of indicating liquid be used in the capillary passage of tube 1 and that this liquid be totally within the capillary so as to avoid any capillary action. The span or length of the indicating liquid in the capillary passage is made small so as to avoid frictional resistance to its passage along the capillary and thereby maintain, for all practical purposes, atmospheric pressure at the discharge end of the standard capillary 10 which is being calibrated. Distilled water to which a small amount of alcohol and coloring matter has been added makes a suitable indicating liquid. Due to the low flow rates of the gas discharged from the standard capillary tube 10, it acquires the temperature surrounding the calibrator prior to entering the bore of tube 1 thereof.

The calibrator of my invention is used for determining flow rates at various pressure settings of the pressure gauge of the halogen leak standard shown and the information thus obtained is applied as an additional scale on this pressure gauge in order to provide a direct reading of flow rate in ounces per year. After a calibration has been made, the by-pass fitting 19 is reapplied to the halogen leak standard 18 and it is then in condition for use in calibrating a halogen leak detector in accordance with the disclosures in my above referred to application.

My above-described gas flow calibrator may be used for purposes other than those described above and may be variously modified in structure and arrangement of parts without departing from the spirit and scope of my invention and I consequently contemplate in the appended claims to cover all such modifications as come within the true spirit and scope of my invention.

What I claim as new and desire to secure by Letters Patent of the United States is:

1. A gas flow calibrator adapted to measure the gas flow through a test instrument comprising a glass tube having a capillary bore terminating at its outer end in a cup-shaped cavity and having a graduated scale extending along a volume calibrated portion of its bore, a manually controlled vent valve having a through passageway therein whose bore is comparable in size to the bore in said glass tube and a vent passageway through the control parts thereof from said through passageway to an enclosure having a discharge opening, a control tube connected to the discharge opening of said enclosure, said control tube being adapted to supply a vacuum to said discharge opening for drawing liquid out of said capillary bore and for drawing indicating liquid into said capillary bore to the region remote from said cup-shaped end, means including said through passageway of said vent valve for completing a gas-tight connection between the inner end of said capillary bore of said glass tube and a source of gas supply whose flow rate is to be determined, and a support associated with said last-mentioned means and said inner end of said glass tube, said support and the volume calibrated portion of said glass tube being angularly disposed relatively to one another to hold said volume calibrated portion of said glass tube in a horizontal position when said support is in a tilted position, said gas moving said indicating liquid toward said cup-shaped end upon the disconnection of said vacuum from said discharge opening, whereby the rate of displacement of said indicating liquid through said capillary by said gas indicates the gas flow rate through said instrument.

2. A gas flow calibrator adapted to measure the gas flow through a tubular member comprising a glass tube having a capillary bore terminating at its outer end in a cup-shaped cavity and having a graduated scale extending along a volume calibrated portion of its bore, a vent valve having a tubular body portion with a bore therethrough comparable in size with the bore in said glass tube and a vent passageway from said bore through the control parts thereof to an enclosure terminating in a discharge tube, a control tube having its end connected with said discharge tube, said control tube being adapted to supply a vacuum to said discharge opening for drawing liquid out of said capillary bore and for drawing indicating liquid into said capillary bore to the region remote from said cup-shaped end, a flexible gas-tight tubular connection between one end of said tubular body portion of said vent valve and the inner end of said glass tube, a second flexible tubular connection extending from and making a gas-tight union with said inner end of said tubular body portion of said valve, said second connection having a projecting end portion which will pass over and make a gas-tight union with the discharge end of a tubular member, and a support for said vent valve, said connections, and said inner end of said glass tube, said gas moving said indicating liquid toward said cup-shaped end upon the disconnection of said vacuum from said discharge opening, whereby the rate of displacement of said indicating liquid through said capillary by said gas indicates the gas flow rate through said instrument.

3. A calibrator for use in measuring the gas flow through a standard capillary tube mounted in a test apparatus and having its discharge end accessible through a fitting mounted on the sloping front of said test apparatus, said calibrator comprising a glass tube having a capillary bore terminating at its outer end in a cup-shaped cavity and having a graduated scale extending along a volume calibrated portion of its bore, a vent valve having a tubular body portion with a bore therethrough comparable in size with the bore in said glass tube and a vent passageway from said bore through the control parts thereof to an enclosure terminating in a discharge tube, a control tube having its end connected with said discharge tube, a flexible gas-tight tubular connection between one end of said tubular body portion of said vent valve and the inner end of said glass tube, a second flexible tubular connection extending from and making a gas-tight union with the other end of said tubular body portion of said valve, said second connection having a projecting end portion which will pass over and make a gas-tight union with the discharge end of said standard capillary tube, a support for said vent valve, said connections, and said inner end of said glass tube, and means including a coupling on said support for mounting said calibrator on said fitting on the sloping front of said test apparatus with the projecting end portion of said second tubular connection forming a gas-tight contact with the discharge end of said standard capillary tube, said support and the volume calibrated portion of said glass tube being angularly disposed relatively to one another to hold said volume calibrated portion of said glass tube in a horizontal position when said support is tilted by its said mounting on the sloping front of said test apparatus.

4. A gas flow calibrator adapted to measure the gas flow through a test instrument comprising: a transparent capillary tube terminating at its outer end in a cup-shaped cavity and having a graduated scale extending along a volume calibrated portion of its bore, means to connect the other end of said capillary tube through a gas tight connection to gas from the test instrument whose flow rate is being measured, vacuum means connected to said connecting means to empty the capillary tube of fluids and to draw a selected quantity of indicating fluid into said capillary tube, and valve means to disconnect said vacuum from acting on said liquid such that the said selected quantity of liquid may be moved by said gas toward said cup-shaped cavity, whereby the rate of displacement of said liquid from said capillary tube by said gas indicates the gas flow rate through said test instrument.

5. A gas flow calibrator adapted to measure the gas flow through a test instrument comprising: a transparent capillary tube terminating at its outer end in a cup-shaped cavity and having a graduated scale extending along a volume calibrated portion of its bore, means to connect the other end of said capillary tube through a gas-tight connection to a gas from the test instrument whose flow rate is being measured, means to provide a vacuum to said connecting means to empty the capillary tube of fluids and to draw a selected quantity of indicating fluid into said capillary tube, and manually controlled valve means positioned intermediate said capillary and test instrument, said valve means having a through passageway whose bore is comparable in size to the bore of said capillary tube and which is included in said connection means, and said valve being adapted to disconnect said vacuum means from said valve passageway such that the said selected quantity of liquid is moved by said gas toward said cup-shaped cavity, whereby the rate of displacement of said liquid from said capillary tube by said gas indicates the gas flow rate through said test instrument.

References Cited in the file of this patent
UNITED STATES PATENTS

| | | |
|---|---|---|
| 688,449 | Tutwiler | Dec. 10, 1901 |
| 2,153,105 | Szecsi | Apr. 4, 1939 |

OTHER REFERENCES

Publication: Article entitled "Metering Gas Flow," by J. C. Westmoreland, Instrumentation, vol. 6, #4 (1953), pages 27–29.